United States Patent [19]

Hanyu et al.

[11] Patent Number: 4,531,466
[45] Date of Patent: Jul. 30, 1985

[54] COMPUTER SEWING MACHINE WITH RESPONSE FUNCTION AS TO THE USAGE THEREOF

[75] Inventors: Susumu Hanyu; Kenji Kato, both of Tokyo, Japan

[73] Assignee: Janome Sewing Machine Co. Ltd., Tokyo, Japan

[21] Appl. No.: 576,533

[22] Filed: Feb. 2, 1984

[30] Foreign Application Priority Data

Feb. 7, 1983 [JP] Japan ................................. 58-17530

[51] Int. Cl.$^3$ .......................... D05B 19/00; D05B 3/02
[52] U.S. Cl. ................................ 112/121.11; 112/453
[58] Field of Search .......... 112/158 E, 121.11, 121.12, 112/275, 277; 364/470; 381/51

[56] References Cited

U.S. PATENT DOCUMENTS 4,465,003  8/1984  Makabe et al. ................. 112/158 E
4,480,561 11/1984  Makabe et al. ................. 112/158 E
4,481,507 11/1984  Takiguchi et al. ............. 112/277 X
4,489,436 12/1984  Yoshimura et al. ............ 112/278 X

*Primary Examiner*—Peter Nerbun
*Attorney, Agent, or Firm*—Michael J. Striker

[57] ABSTRACT

A computer sewing machine having a plurality of sewing related operating functions and including voice generating components driven by a drive signal and producing voice information concerning various information items including at least malfunctioning and their explanations and handling and their explanations for the sewing machine, process designation input components for producing signals for starting the process of the information items produced from the voice generating means, response input components including at least two switches selectively operated to produce signals to affirm or negate the information items produced by the voice generating components, reception/discrimination components for receiving the signals from the process designation input components and from the response input components to discriminate the designation of the information items, a stitch control device, malfunction diagnosing components for diagnosing malfunctions of the sewing machine on the basis of control operation of the stitch control device to produce signals indicating a malfunction of the sewing machine, specifying components for receiving the signals from the malfunction diagnosing components and from the reception/discrimination components to specify the information items, a language signal storing memory containing language signals, and language synthesizing components operated by the signal from the specifying components.

1 Claim, 3 Drawing Figures

FIG_1
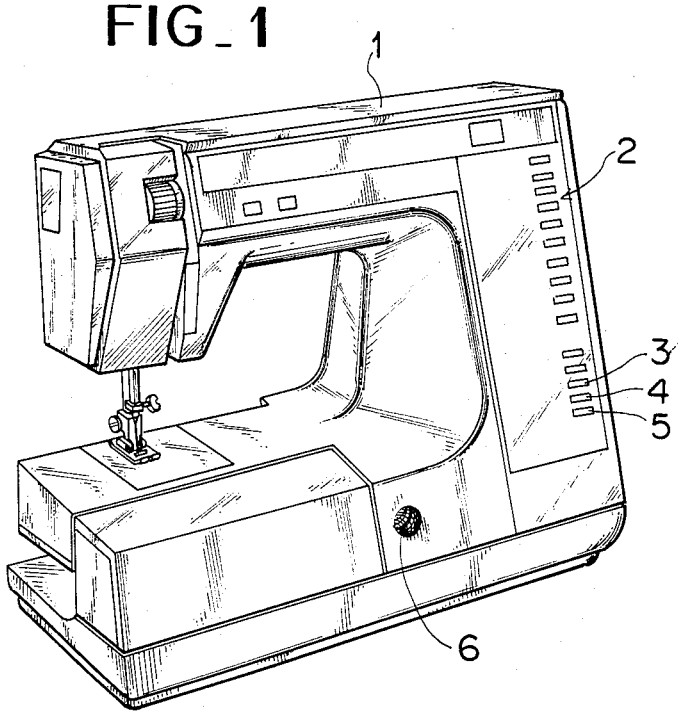
FIG_2
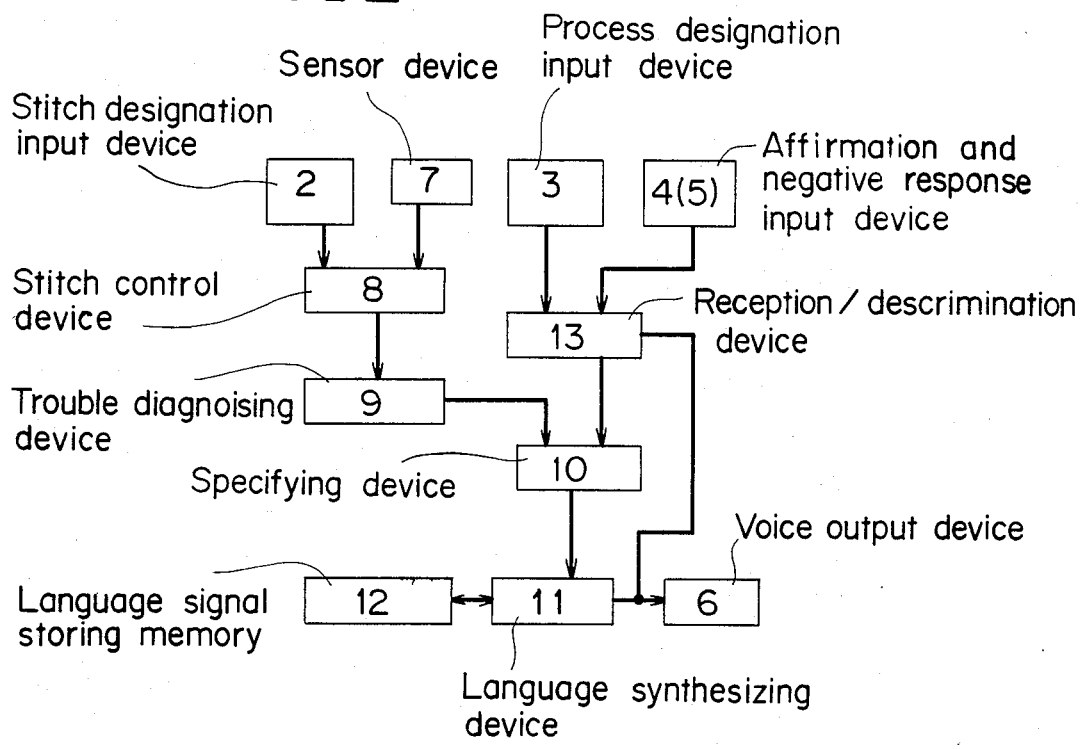

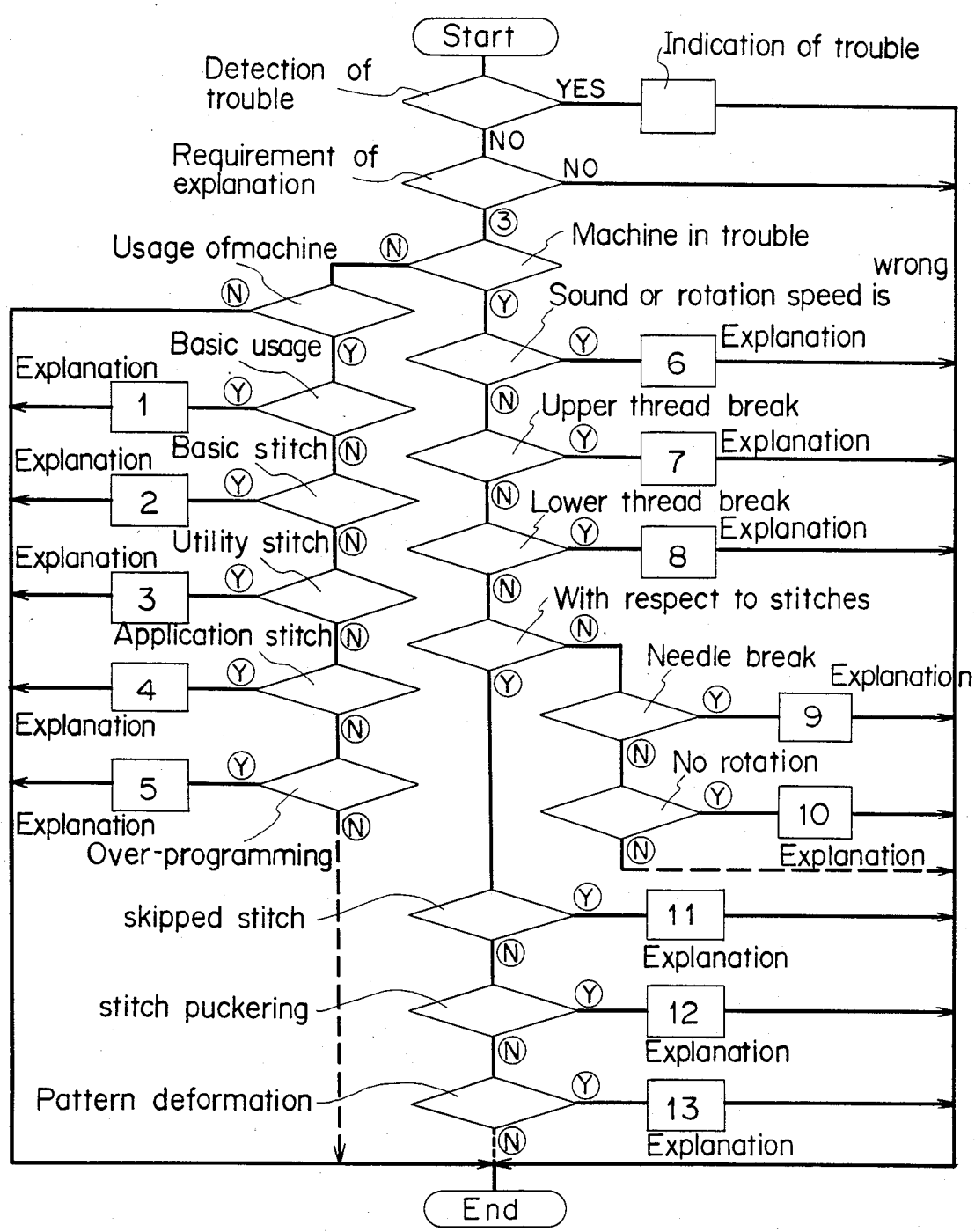
FIG_3

COMPUTER SEWING MACHINE WITH RESPONSE FUNCTION AS TO THE USAGE THEREOF

BACKGROUND OF THE INVENTION

The invention relates to a sewing machine with a number of operating functions being placed under computer control, and more particularly relates to a computer sewing machine with a voice response function as to the usage thereof.

So far, the operator has generally used sewing machines with reference to an instruction manual. However the sewing machine has been recently computerized and has come to have much more operating functions related to sewing. As a result, it has often been inconvenient for the operator to be unable to find out the causes of abnormal phenomena when the latter happen during manipulation of such a sewing machine.

SUMMARY OF THE INVENTION

It is therefore an object of the present invention to eliminate such an inconvenience, and to provide a computer sewing machine with operating devices of simple structure which may be easily manipulated to produce voice instructions in response to the usage of the sewing machine.

According to the present invention, the malfunctions of the sewing machine are found out by a diagnosing device and these troubles are indicated in a voice from a voice generating device. Operating part may be manipulated to request voice explanation items in the form of questions to be produced from the voice generating device. In response to the questions, another operating part may be manipulated to affirm the questions and thereby request the explanations about the questions, or another operating part may be manipulated to negate the questions to thereby proceed to the next question until a required question is produced. Thus, the questions are sequentially advanced to obtain the voice explanations about the required questions for dealing with the malfunctions and handling of the sewing machine.

The other features and advantages of the present invention will be apparent from the following description of a preferred embodiment with reference to the attached drawings.

BRIEF DESCRIPTION OF THE DRAWINGS

FIG. 1 is a perspective view of the sewing machine provied with the present invention;

FIG. 2 is a block-diagram of the control system of the present invention; and

FIG. 3 is a flow chart of the control of the present invention.

DETAIL DESCRIPTION OF THE PREFERRED EMBODIMENT

The invention will be explained on the basis of a preferred embodiment as shown in the drawings. In reference to FIG. 1, a sewing machine 1 has on its front face thereof a number of pattern selecting switches 2 forming a stitch designation input device, a process designation switch 3 forming an input device which is subject to one-way operation to start the process of the explanation items, an affirmative switch 4 and a negative switch 5 forming affirmative and negative response input devices which are each subject to one-way operation to produce the affirmative and negative response to the questions, and a voice generating device 6 as a voice output device.

In FIG. 2 is shown a block diagram of the control system. A sensor device 7 detects the upper and lower needle phases, the rotation speed of the sewing machine and the presence or absence of the lower thread, and then gives the results to a stitch control device 8. The stitch control device 8 receives the pattern designation, pattern memorizing designation and stitch adjusting designation, etc, from the stitch designation input devices 2 and the detection signals from the sensor 7, and then carries out the stitch control and drive control of the sewing machine. A malfunction diagnosing device 9 diagnoses the malfunctions, if any, in these signals from the stitch designation input device 2 and the sensor device 7 and produces the output signals indicating such malfunctions.

A specifying device 10 receives the malfunction indicating signals and provides to a language synthesizing device 11 the signals specifying the contents of the malfunctions. The language synthesizing device 11 reads out the language signals from a language signal memory 12 on the basis of the malfunction specifying signals and synthesizes the language signals, and then gives the synthesized language signals to a language output device 6 as the drive signals. The voice generating device 6 is then operated to produce a natural voice language, which may however be replaced by one-letter representation by using a liquid crystal.

The process designation switch is operated to start a language output process regarding the explanation of the machine malfunction or machine handling. A reception/discrimination device 13 receives the start designation and supplies the same to the specifying device 10. The specifying device 10 is then operated to specify "explanation is required" (as shown by a mark ③ in the flow chart of FIG. 3) at the discrimination of the explanation required, and carries out a series of subsequent program processes.

In reference to the questions provided by the language output device 6 concerning the machine malfunctions and handlings, for example, such items as shown in the parantheses in FIG. 3, the operator presses the affirmative response switch 4 to affirm the questions as shown by Ⓨ or presses the negative response switch 5 to negate the questions as shown by Ⓝ. The reception/discrimination device 13 compares the signals from the affirmative and negative response input devices 4, 5 and the drive signals from the language synthesizing device 11 to discriminate Ⓨ or Ⓝ with respect to the questions, and then supplies the output signals to the specifying device 10. If the output signal is Ⓨ, the explanations 1–13 as shown in FIG. 3 are specified in relation to the respective questions as shown, and are produced from the language output device 6. If the output signal is Ⓝ, a series of subsequent processes are specified as shown, and the questions are produced one after another from the language output device. In these processes, the language synthesizing device 11, the language storing memory 12, etc., serve to synthesize the languages as in the case of the trouble warning process.

With the abovementioned combination of devices and the functions thereof, the invention operates as follows: when a control power source is turned on, the program is repeatedly carried out from the "Start" to the "End" as shown in FIG. 3 in a proper time among the other programs of the sewing machine.

At first if a lower thread detector (not shown) of the sensor device 7 works in the judging process of malfunction detection, it is judged that the lower thread is not present, and the voice generating device 6 produces a voice indicating the fact. Or in the case when the number of patterns is over a predetermined amount when the stitch designation input device 2 is operated to memorize a plurality of patterns to produce a series of stitches of different patterns, the voice generating device 6 produces a voice indicating the fact. When no malfunction is detected, it is judged if there is a request of explanation about the machine malfunctions and handlings. If there is no request of explanation, the program is finished and returns to "Start".

If the process designation switch 3 is once operated, a flag is elected indicating that there is a request of explanation, and the program advances to the line ③ in FIG. 3. Then the voice generating device 6 produces a voice of question asking if there is a request of explanation about "Machine is in trouble". The "Machine is in trouble" in the juding process awaits the affirmative response switch 4 or the negative response switch 5 to be pressed. If the affirmative response switch 4 is pressed, the program advances to the Ⓨ and the subsequent processes are sequentially carried out for making the explanation of the malfunction. If the negative response switch 5 is pressed, the program advances to the Ⓝ and the subsequent processes are sequentially carried out for making the explanation of the handling. If any of the switches 4 are not pressed, the program advances to N with respect to all the subsequent judgements.

When the designation is Ⓨ to the question concerning the "Usage of sewing machine", the Explanation 1 is produced in voice. The Explanation 1 concerns the usage of the presser foot, a thread, a fabric to be stitched, a needle, a lower thread winding, etc. Similarly when the response is Ⓨ to the question concerning the "Basic stitch", the Explanation 2 is produced with respect to the straight stitches and the zigzag switches. In the same manner, various Explanations are made in voice one after another with respect to the machine handlings. When the designation is Ⓨ to the question concerning the "Machine is in trouble", a question is made if the machine malfunction concerns the "Sound or rotation speed is wrong". If the designation is Ⓨ, then the Explanation 6 is made concerning the phenomena of a loop taker and a feeding device being short of lubricant or being jammed, and the handling thereof. In the same way, the explanations about the troubles are made in response to the questions until the Explanation 13 is reached.

Further in FIG. 3, when the designation is Ⓝ in response to the question if it is concerning the malfunction "With respect to stitches", the questions are omitted concerning the "Skippedstitch", "Stitch puckering", "Pattern deformation", etc., and the program advances to the questions concerning the "Needle break" and "No rotation", so that the required explanation may be easily reached.

What is claimed is:

1. A computer sewing machine having a plurality of sewing related operating functions, comprising:

voice generating means driven by a drive signal and producing voice information concerning various information items including at least malfunctioning and explanations thereof, and handling and explanations thereof for the sewing machine;

process designation input means for producing signals for starting the process of said information items produced from said voice generating means;

response input means including at least two switches selectively operated to produce signals to affirm or negate said information items produced by said voice generating means;

reception/discrimination means for receiving said signals from said process designation input means and from said response input means to discriminate the designation of said information items, said reception/discrimination means comparing said signals received with said drive signal to selectively match the designation of said response input means with said information items and producing a signal;

a stitch control device;

malfunction diagnosing means for diagnosing malfunctions of the sewing machine on the basis of control operation of said stitch control device to produce signals indicating a malfunction of the sewing machine;

specifying means for receiving said signals from said malfunction diagnosing means and from said reception/discrimination means to specify said information items, said specifying means being operated to produce a signal in response to the designation of said response input means to specify a next specific information item of said information items;

a language signal storing memory containing language signals; and language synthesizing means operated by said signal from said specifying means to read out said language signals from said language signal storing memory regarding said specified information item of said information items in order to synthesize the contents of said information items and produce said drive signal for ddriving said voice generating means.

* * * * *